United States Patent
Ikoma et al.

(10) Patent No.: US 7,753,016 B2
(45) Date of Patent: Jul. 13, 2010

(54) CONTROL APPARATUS FOR INTERNAL COMBUSTION ENGINE

(75) Inventors: Takuya Ikoma, Nishikamo-gun (JP); Kazutaka Fujioka, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 359 days.

(21) Appl. No.: 11/990,463

(22) PCT Filed: Apr. 26, 2007

(86) PCT No.: PCT/IB2007/001081

§ 371 (c)(1),
(2), (4) Date: Feb. 14, 2008

(87) PCT Pub. No.: WO2007/129168

PCT Pub. Date: Nov. 15, 2007

(65) Prior Publication Data

US 2009/0099752 A1    Apr. 16, 2009

(30) Foreign Application Priority Data

Apr. 28, 2006    (JP) .............................. 2006-126131

(51) Int. Cl.
*F01L 1/34* (2006.01)
*F01L 1/02* (2006.01)
(52) U.S. Cl. .................. 123/90.15; 123/90.27
(58) Field of Classification Search .............. 123/90.15, 123/90.27, 90.44, 321, 322, 345–348
See application file for complete search history.

(56) References Cited

U.S. PATENT DOCUMENTS

| | | | | |
|---|---|---|---|---|
| 5,553,573 A | * | 9/1996 | Hara et al. ............... | 123/90.15 |
| 6,189,497 B1 | * | 2/2001 | Griffiths .................. | 123/90.15 |
| 6,394,051 B1 | * | 5/2002 | Filipe et al. .............. | 123/90.15 |
| 6,705,259 B1 | * | 3/2004 | Sellnau et al. ........... | 123/90.16 |
| 7,258,100 B2 | * | 8/2007 | Pinkston .................. | 123/316 |
| 7,607,410 B2 | * | 10/2009 | Magner et al. ........... | 123/90.15 |
| 2003/0127063 A1 | * | 7/2003 | Wang ...................... | 123/90.16 |
| 2003/0196619 A1 | | 10/2003 | Takagi | |
| 2005/0178357 A1 | | 8/2005 | Yui et al. | |
| 2009/0299603 A1 | * | 12/2009 | Fuwa ........................ | 701/103 |

FOREIGN PATENT DOCUMENTS

| | | |
|---|---|---|
| JP | A-2002-161768 | 6/2002 |
| JP | A-2002-256912 | 9/2002 |
| JP | A-2005-232992 | 9/2005 |
| WO | WO 2004/104394 A1 | 12/2004 |
| WO | WO 2004/109079 A1 | 12/2004 |

* cited by examiner

*Primary Examiner*—John T Kwon
(74) *Attorney, Agent, or Firm*—Oliff & Berridge, PLC

(57) ABSTRACT

A control apparatus for an internal combustion engine includes a variable valve mechanism that changes the duration of an intake valve, and a controller that controls the variable valve mechanism to change the duration based on the operating state of the internal combustion engine. If a determination that there is a possibility of engine stalling is made when the internal combustion engine idling, the controller controls the variable valve mechanism so that the duration of the intake valve is made shorter than the duration which is achieved when the determination is made, only during the period until several four-stroke cycles of the internal combustion engine have elapsed after the determination is made. Thus, it is possible to appropriately suppress occurrence of engine stalling when the internal combustion engine is running at a low speed.

12 Claims, 6 Drawing Sheets

CONTROL APPARATUS FOR INTERNAL COMBUSTION ENGINE

INCORPORATION BY REFERENCE

The disclosure of Japanese Patent Application No. 2006-126131 filed on Apr. 28, 2006 including the specification, drawings and abstract is incorporated herein by reference in its entirety.

BACKGROUND OF THE INVENTION

1. Field of the Invention

The invention relates to a control apparatus for an internal combustion engine.

2. Description of the Related Art

Conventionally, auxiliaries mounted in a vehicle such as an air-conditioner, a power steering device, and a headlamp are directly or indirectly driven by the output from an internal combustion engine for a vehicle. When such an internal combustion engine is running at a low speed, for example, idling, the amount of air taken in a combustion chamber is increased if it is determined that an auxiliary is turned on. Increasing the intake air amount in this manner suppresses reduction in the engine speed that is likely to occur due to an increase in the engine load caused by turning on the auxiliary.

There is a conventional technology in which the intake air amount is increased by adjusting the opening amount of a throttle valve arranged in an intake air passage. With this technology, however, a non-negligible time-lag is caused between when the throttle valve is controlled and when the amount of air in the combustion chamber is actually increased.

Japanese Patent Application Publication No. 2005-232992 (JP-A-2005-232992) describes a technology in which a variable valve mechanism that adjusts the duration of an intake valve is provided in an internal combustion engine, and the amount of air taken in a combustion chamber is increased by the variable valve mechanism. In this internal combustion engine, the intake air amount is increased by controlling the variable valve mechanism to extend the duration of the intake valve. As a result, the amount of air actually taken in the combustion chamber is rapidly increased.

If the duration of the intake valve is extended, the period during which the intake valve is open is prolonged. Accordingly, the period during which both the intake valve and an exhaust valve are open, namely, the valve overlap time is also prolonged. If the valve overlap time is prolonged, the following non-negligible inconveniences are caused.

Because the air flowing through the intake passage pulsates, the pressure in the intake passage constantly changes. Accordingly, if the valve overlap time is prolonged, the exhaust gas flowing through an exhaust passage is more easily drawn back into a cylinder due to a negative pressure produced in the intake passage. Accordingly, the amount of exhaust gas that remains in the combustion chamber increases, which reduces the efficiency of combustion that takes place in the combustion chamber. Accordingly, when the engine load is increased while the internal combustion engine is running at a low speed, if the duration of the intake valve is extended to increase in intake air amount, the combustion efficiency may be reduced rather than being enhanced and engine stalling may be caused.

SUMMARY OF THE INVENTION

The invention is made in light of the above-described circumstances. The invention, therefore, provides a control apparatus for an internal combustion engine, which executes the control with the influence of the exhaust gas that remains in a combustion chamber taken into account, thereby appropriately suppressing occurrence of engine stalling when the internal combustion engine is running at a low speed.

A first aspect of the invention relates to a control apparatus for an internal combustion engine, which includes a variable valve mechanism that changes the duration of at least one of an intake valve and an exhaust valve, and a controller that controls the variable valve mechanism to change the duration based on the operating state of the internal combustion engine. If a determination that there is a possibility of engine stalling is made when the internal combustion engine is running at a low speed, the controller controls the variable valve mechanism so that the duration of at least one of the intake valve and the exhaust valve is a duration that is shorter than the duration which is achieved when the determination is made, only during the period until several four-stroke cycles of the internal combustion engine have elapsed after the determination is made.

With the control apparatus for an internal combustion engine described above, if the determination that there is a possibility of engine stalling is made when the internal combustion engine is running at a low speed, the duration of the intake valve is made shorter than the duration which is achieved when the determination is made, only during the period until several four-stroke cycles of the internal combustion engine have elapsed after the determination is made. Accordingly, it is possible to reduce the valve overlap time only during the period until several four-stroke cycles of the internal combustion engine have elapsed after the determination that there is a possibility of engine stalling is made. As a result, the situation where the exhaust gas in the exhaust passage is drawn back into a cylinder due to a negative pressure produced in the intake passage is less prone to occur. Accordingly, it is possible to reduce the amount of exhaust gas that remains in a combustion chamber to stabilize the combustion state.

If the duration of the intake valve is made shorter, the intake air amount is temporarily reduced. However, in such a short period until several four-strokes of the internal combustion engine have elapsed after the determination is made, the influence of the reduction in the amount of exhaust gas that remains in the combustion chamber is greater than the influence of the reduction in the intake air amount. Accordingly, the improvement in the combustion state due to the reduction in the amount of exhaust gas that remains in the combustion chamber far outweighs the deterioration of the combustion state due to the reduction in the intake air amount. When the duration of the exhaust valve is reduced, it is possible to reduce the amount of exhaust gas that remains in the combustion chamber without reducing the intake air amount.

After several four-stroke cycles of the internal combustion engine have elapsed after it is determined that there is a possibility of engine stalling, the variable valve mechanism is controlled so that the duration is the duration appropriate for the engine operating state. Accordingly, even if the duration of the intake valve is reduced, it is possible to suppress the deterioration of the combustion state due to reduction in the intake air amount.

In the first aspect of the invention, the variable valve mechanism may change the duration of the intake valve and the duration of the exhaust valve. If the determination that there is a possibility of engine stalling is made when the internal combustion engine is running at a low speed, the variable valve mechanism may be controlled so that the duration of each of the intake valve and the exhaust valve is the duration that is shorter than the duration which is achieved when the determination is made, only during the period until several four-stroke cycles of the internal combustion engine have elapsed after the determination is made.

With the control apparatus for an internal combustion engine described above, the duration of each of the intake valve and the exhaust valve is made shorter than the duration which is achieved when the determination that there is a possibility of engine stalling is made. Accordingly, it is possible to further reduce the valve overlap time. As a result, it is possible to further reduce the amount of exhaust gas that remains in the combustion chamber. After several four-stroke cycles of the internal combustion engine have elapsed after the determination that there is a possibility of engine stalling is made, the variable valve mechanism is controlled so that the duration that is appropriate for the engine operating state is achieved. Accordingly, it is possible to suppress the deterioration of the combustion state due to reduction in the intake air amount.

A second aspect of the invention relates to a control apparatus for an internal combustion engine, which includes a valve timing variable mechanism that changes valve timing of at least one of an intake valve and an exhaust valve, and a controller that controls the variable valve mechanism to change the valve timing based on the operating state of the internal combustion engine. If a determination that there is a possibility of engine stalling is made when the internal combustion engine is running at a low speed, the controller controls the valve timing variable mechanism so that the valve timing of at least one of the intake valve and the exhaust valve is valve timing that differs from the valve timing which is achieved when the determination is made, only during the period until several four-stroke cycles of the internal combustion engine have elapsed after the determination is made.

With the control apparatus for an internal combustion engine described above, if a determination that there is a possibility of engine stalling is made when the internal combustion engine is running at a low speed, the valve timing variable mechanism is controlled so that the valve timing of at least one of the intake valve and the exhaust valve is valve timing that differs from the valve timing which is achieved when the determination is made, only during the period until several four-stroke cycles of the internal combustion engine have elapsed after the determination is made. Accordingly, it is possible to reduce the valve overlap time, during which both the exhaust valve and the intake valve are open, only during the period until several four-stroke cycles of the internal combustion engine have elapsed after the determination that there is a possibility of engine stalling is made. As a result, the situation where the exhaust gas in the exhaust passage is drawn into a cylinder due to a negative pressure produced in the intake passage is less prone to occur. Accordingly, it is possible to reduce the amount of exhaust gas that remains in the combustion chamber to stabilize the combustion state. After several four-stroke cycles of the internal combustion engine have elapsed after the determination that there is a possibility of engine stalling is made, the valve timing variable mechanism is controlled so that the valve timing appropriate for the engine operating state is achieved. Accordingly, it is possible to suppress the deterioration of the combustion state due to a change in the valve timing.

In the second aspect of the invention, if the determination that there is a possibility of engine stalling is made when the internal combustion engine is running at a low speed, the valve timing variable mechanism may be controlled so that the valve timing of the intake valve is valve timing that is retarded with respect to the valve timing which is achieved when the determination is made, only during the period until several four-stroke cycles of the internal combustion engine have elapsed after the determination is made.

With the control apparatus for an internal combustion engine described above, if the determination that there is a possibility of engine stalling is made when the internal combustion engine is running at a low speed, the valve timing variable mechanism is controlled so that the valve timing of the intake valve is valve timing that is retarded with respect to the valve timing which is achieved when the determination is made, only during the period until several four-stroke cycles of the internal combustion engine have elapsed after the determination is made. Accordingly, it is possible to reduce the valve overlap time only during the period until several four-stroke cycles of the internal combustion engine have elapsed after it is determined that there is a possibility of engine stalling. Accordingly, the situation where the exhaust gas in the exhaust passage is drawn back into the cylinder due to a negative pressure produced in the intake passage is less prone to occur. Accordingly, it is possible to reduce the amount of exhaust gas that remains in the combustion chamber to stabilize the combustion state. After several four-stroke cycles of the internal combustion engine have elapsed after it is determined that there is a possibility of engine stalling, the valve timing variable mechanism is controlled to achieve the valve timing appropriate for the engine operating state. Accordingly, even if the intake air amount is temporarily reduced due to a change in the valve timing, it is possible to suppress the deterioration of the combustion chamber due to reduction in the intake air amount.

In the second aspect of the invention, if the determination that there is a possibility of engine stalling is made when the internal combustion engine is running at a low speed, the valve timing variable mechanism may be controlled so that the valve timing of the exhaust valve is valve timing that is advanced with respect to the valve timing which is achieved when the determination is made, only during the period until several four-stroke cycles of the internal combustion engine have elapsed after the determination is made.

With the control apparatus for an internal combustion engine described above, if the determination that there is a possibility of engine stalling is made when the internal combustion engine is running at a low speed, the valve timing variable mechanism is controlled so that the valve timing of the exhaust valve is valve timing that is advanced with respect to the valve timing which is achieved when the determination is made, only during the period until several four-stroke cycles of the internal combustion engine have elapsed after the determination is made. Accordingly, it is possible to reduce the valve overlap time only during the period until several four-stroke cycles of the internal combustion engine have elapsed after it is determined that there is a possibility of engine stalling. As a result, the situation where the exhaust gas in the exhaust passage is drawn back into the cylinder due to a negative pressure produced in the intake passage is less prone to occur. Accordingly, it is possible to reduce the amount of exhaust gas that remains in the combustion chamber to stabilize the combustion state. In addition, because the combustion state is improved by changing the valve timing of the exhaust valve, it is possible to reduce the amount of exhaust gas that remains in the combustion chamber without reducing the intake air amount.

In the second aspect of the invention, if the determination that there is a possibility of engine stalling is made when the internal combustion engine is running at a low speed, the valve timing variable mechanism may be controlled so that the valve timing of the intake valve is valve timing that is retarded with respect to the valve timing which is achieved when the determination is made, and the valve timing of the exhaust valve is valve timing which is advanced with respect to the valve timing which is achieved when the determination is made, only during the period until several four-stroke cycles of the internal combustion engine have elapsed after the determination is made.

With the control apparatus for an internal combustion engine described above, if a determination that there is a possibility of engine stalling is made, the valve timing of the intake valve is retarded and the valve timing of the exhaust valve is advanced. Accordingly, it is possible to further reduce the valve overlap time. As a result, if the determination that there is a possibility of engine stalling is made, the amount of exhaust gas that remains in the combustion chamber is further reduced. After the period until several four-stroke cycles of the internal combustion engine have elapsed after the determination that there is a possibility of engine stalling is made, the valve timing variable mechanism is controlled so that the valve timing of each of the intake valve and the exhaust valve is the valve timing appropriate for the engine operating state. Accordingly, it is possible to suppress the deterioration of the combustion state due to reduction in the intake air amount.

In each of the first and the second aspect of the invention, it may be determined that there is a possibility of engine stalling, when at least two of i) the condition where the speed of the internal combustion engine is equal to or lower than a predetermined value, ii) the condition where the amount of change in the speed of the internal combustion engine is equal to or greater than a predetermined value, and iii) the condition where an auxiliary that is driven by the internal combustion engine is started are satisfied.

BRIEF DESCRIPTION OF THE DRAWINGS

The features, advantages thereof, and technical and industrial significance of this invention will be better understood by reading the following detailed description of example embodiments of the invention, when considered in connection with the accompanying drawings, in which.

DETAILED DESCRIPTION OF THE EXAMPLE EMBODIMENTS

In the following description and the accompanying drawings, the present invention will be described in more detail with reference to example embodiments.

A control apparatus for an internal combustion engine according to a first embodiment of the invention will be described with reference to FIGS. 1 to 3.

Figure 1:
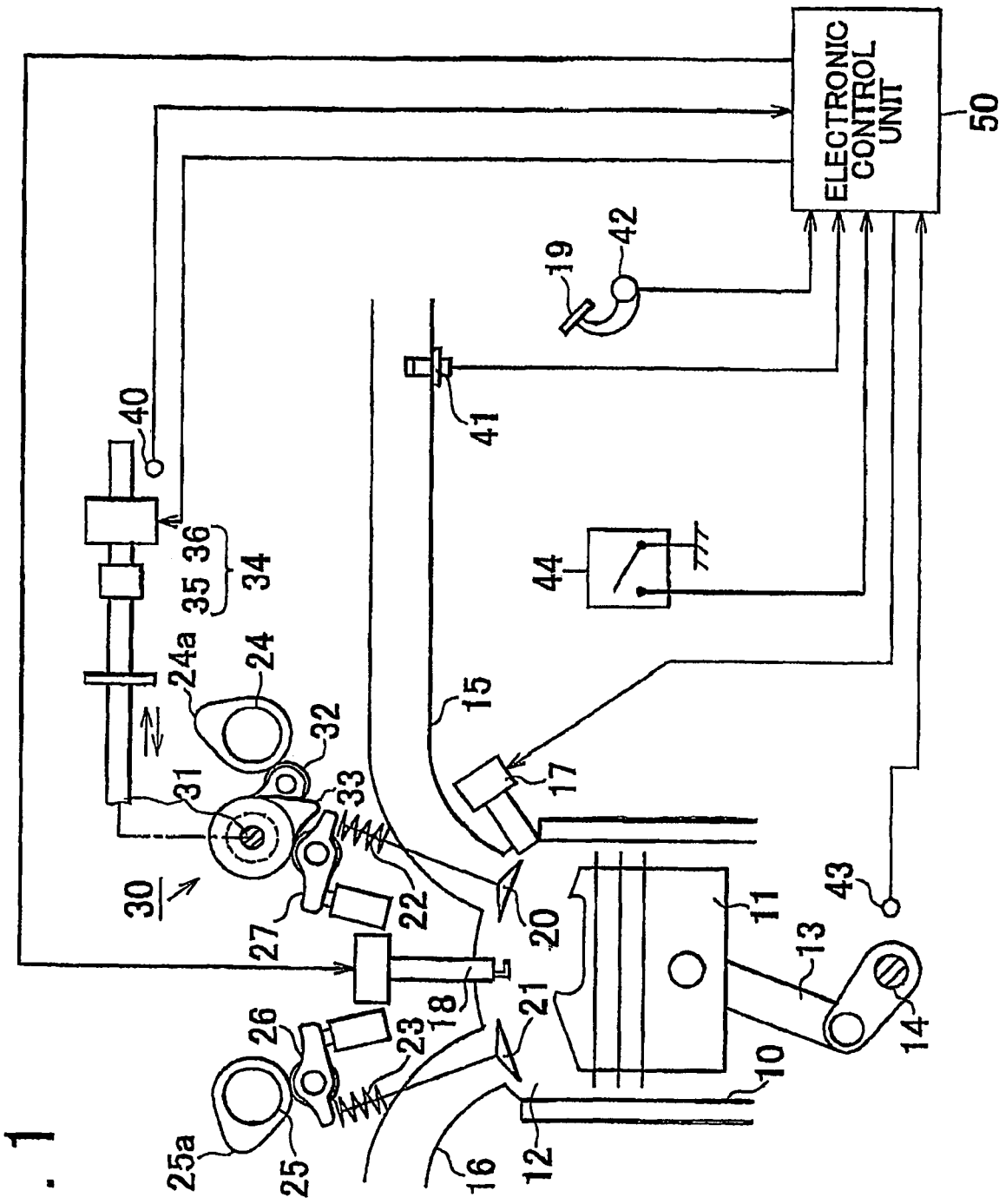
FIG. 1 is the view schematically showing the structure of a control apparatus according to a first embodiment of the invention.

As shown in FIG. 1, a piston 11 is arranged in a cylinder 10 of the internal combustion engine such that the piston 11 can reciprocate in the cylinder 10. A crankshaft 14 is connected to the piston 11 via a connecting rod 13. A combustion chamber 12 is defined by the top face of the piston 11 and the inner wall face of the cylinder 10. An intake passage 15 and an exhaust passage 16 are connected to the combustion chamber 12.

The internal combustion engine is provided with an electromagnetically-driven fuel injection valve 17. The fuel injection valve 17 opens in response to the passage of electric current therethrough to inject the fuel into the combustion chamber 12. The internal combustion engine is provided with a spark plug 18. The spark plug 18 produces a spark in response to the passage of electric current therethrough.

The internal combustion engine is provided with an intake valve 20 that opens/blocks the opening of the combustion chamber 12 into the intake passage 15, and an exhaust valve 21 that opens/blocks the opening of the combustion chamber 12 into the exhaust passage 16. Valve springs 22 and 23 constantly apply force to the intake valve 20 and the exhaust valve 21, respectively, so as to block the openings described above.

The internal combustion engine is provided with an exhaust camshaft 25 with an exhaust cam 25a, which is provided for the exhaust valve 21. An exhaust rocker arm 26 is arranged between the exhaust cam 25a and the exhaust valve 21. The torque of the crankshaft 14 is transferred to the exhaust camshaft 25, and the exhaust camshaft 25 and the exhaust cam 25a are rotated by the torque. When the exhaust camshaft 25 rotates, the exhaust rocker arm 26 is driven by the exhaust cam 25a, and the exhaust valve 21 is opened by the exhaust rocker arm 26 against the spring force of the valve spring 23.

The internal combustion engine is provided with an intake camshaft 24 with an intake cam 24a, which is provided for the intake valve 20. A variable valve mechanism 30 that changes the duration of the intake valve 20 and an intake rocker arm 27 are arranged between the intake cam 24a and the intake valve 20. The torque of the crankshaft 14 is transferred to the intake camshaft 24, and the intake camshaft 24 and the intake cam 24a are rotated by the torque. When the intake camshaft 24 rotates, the variable valve mechanism 30 and the intake rocker arm 27 are driven by the intake cam 24a. The intake valve 20 is opened by the variable valve mechanism 30 and the intake rocker arm 27 against the spring force of the valve spring 22.

The structure of the variable valve mechanism 30 will be described below. The variable valve mechanism 30 includes a control shaft 31, an input arm 32, and an output arm 33. The input arm 32 contacts the intake cam 24a, and the output arm 33 contacts the intake rocker arm 27. The input arm 32 and the output arm 33 are fitted to the control shaft 31 that is arranged in parallel with the intake camshaft 24 such that the intake arm 32 and the output arm 32 pivot with respect to the control shaft 31 but the movements thereof in the axial direction is limited. Helical splines are formed in the inner peripheral faces of the input arm 32 and the output arm 33. These helical splines are directed in the opposite directions. A slider gear (not shown) is fitted around the control shaft 31, and helical splines, one of which meshes with the helical spline of the input arm 32 and the other of which meshes with the helical spline of the output arm 33, are formed in the outer peripheral face of the slider gear. The variable valve mechanism 30 is provided with an electric actuator 34 that moves the control shaft 31 in the axial direction. The electric actuator 34 includes a rotational-linear movement converting mechanism 35 that is connected to the control shaft 31 and an electric motor 36 that transfers torque to the rotational-linear movement converting mechanism 35. The slider gear is fitted around the control shaft 31, and moves in the axial direction in accordance with the movement of the control shaft 31. The rotational-linear movement converting mechanism 35 converts the torque produced by the electric motor 36 into a thrust force, and linearly moves the control shaft 31 using the thrust force.

The internal combustion engine is provided with various sensors that detect the operating states, etc. of the internal combustion engine. The crankshaft 14 is provided with a crank angle sensor 43 that outputs a signal each time the crank shaft 14 rotates by a predetermined angle. The crank angle sensor 43 detects the rotational angle (the crank angle CA) and the rotational speed (the engine speed NE) of the crankshaft 14. An airflow meter 41 that detects the intake air amount GA is arranged in the intake passage 15. An accelerator pedal 19 is provided with an accelerator pedal operation amount sensor 42 that detects the depression amount of the accelerator pedal 19 (the accelerator pedal depression amount ACCP). The variable valve mechanism 30 is provided with a position sensor (a duration sensor 40) that detects the position of the control shaft 31. The duration $V\theta$ of the intake valve is detected by the duration sensor 40. An air-conditioner that is indirectly driven by the output from the internal combustion engine is provided with an air-conditioner switch 44 that detects whether the operation for turning on the air-conditioner or the operation for turning off the air-conditioner is performed.

The signals indicating the values detected by the sensors 40 to 44 are transmitted to an electronic control unit 50 for an internal combustion engine. The electronic control unit 50 includes memory that stores various control programs, computation maps, the data calculated when the controls are executed, etc. The electronic control unit 50 controls the electric currents passed through the fuel injection valve 17 and the spark plug 18 based on the signals from the sensors 40 to 44. The electronic control unit 50 also controls various components such as the variable valve mechanism 30.

The operation when the variable valve mechanism 30 opens the intake valve 20 will be described below. When the input arm 32 is pressed by the intake cam 24a, the input arm 32 pivots about the control shaft 31, and the output arm 33 also pivots about the control shaft 31. When the intake rocker arm 27 is pressed by the output arm 33 in accordance with the pivot movement of the output arm 33, the intake rocker arm 27 pivots and the intake valve 20 is opened against the spring force of the valve spring 22.

Next, the operation when the variable valve mechanism 30 changes the duration and the lift of the intake valve 20 will be described. When the control shaft 31 is moved in the axial direction by the electric actuator 34, the slider gear moves in the axial direction along with the control shaft 31. Because the slider gear moves in the axial direction in the state where movements of the input arm 32 and the output arm 33 in the axial direction are limited, the helical splines formed therein cause the input arm 32 and the output arm 33 to pivot with respect to the slider gear. Because the helical splines, which are directed in the opposite directions, are formed in the inner peripheral faces of the input arm 32 and the output arm 33 and the slider gear fitted around the control shaft 31 meshes with these helical splines as described above, the input arm 32 and the output arm 33 pivot in the opposite directions. In accordance with the pivot movements of the input arm 32 and the output arm 33, the relative phase between the input arm 32 and the output arm 33 changes. Accordingly, it is possible to change the time and position, at which the output arm 33 presses the intake rocker arm 27, when the intake cam 24a presses the input arm 32. As a result, it is possible to change the duration $V\theta$ and the lift VL of the intake valve 20.

Figure 2:
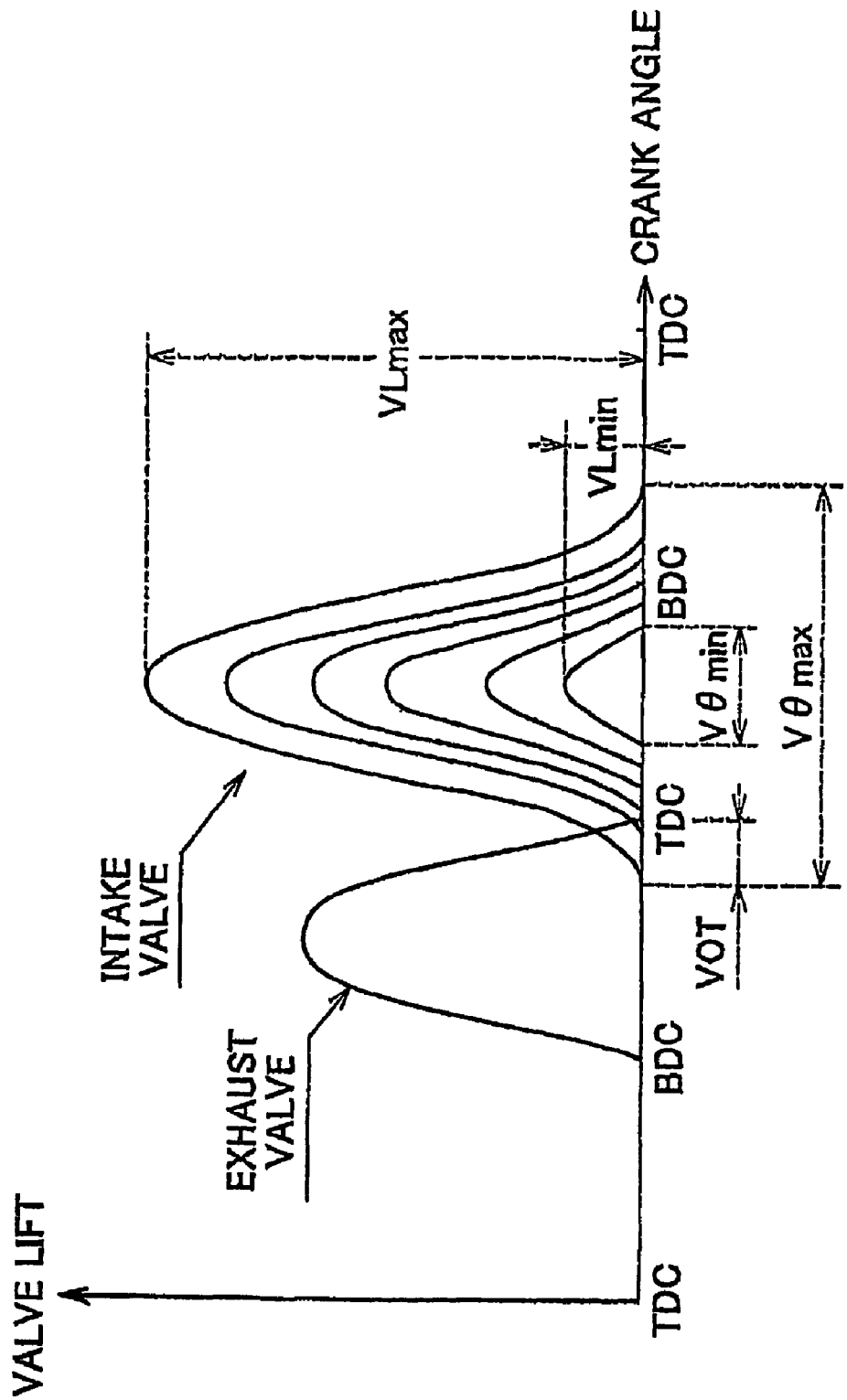
FIG. 2 is the graph showing the manner in which the duration and the lift of an intake valve are changed by a variable valve mechanism in the control apparatus in FIG. 1.

As shown in FIG. 2, the duration $V\theta$ of the intake valve 20 can be continuously changed within the range from the minimum duration $V\theta$min to the maximum duration $V\theta$max. In accordance with a change in the duration $V\theta$, the lift VL of the intake valve 20 can be continuously changed within the range from the minimum lift VLmin to the maximum lift VLmax. The duration $V\theta$ is the period during which the intake valve 20 is open, which is expressed in the rotational angle (the crank angle in FIG. 2) of the intake camshaft 24. As shown in FIG. 2, the period during which both the intake valve 20 and the exhaust valve 21 are open, that is, the valve overlap time VOT shown in FIG. 2 can be changed by the variable valve mechanism 30.

Next, the control for changing the duration of the intake valve 20, which is performed in the internal combustion engine described above, will be described with reference to FIG. 3. The routine in the flowchart in FIG. 3 is periodically executed by the electronic control unit 50 at predetermined intervals. Before the flowchart is started, the count value CINIT is set to "0".

Figure 3:
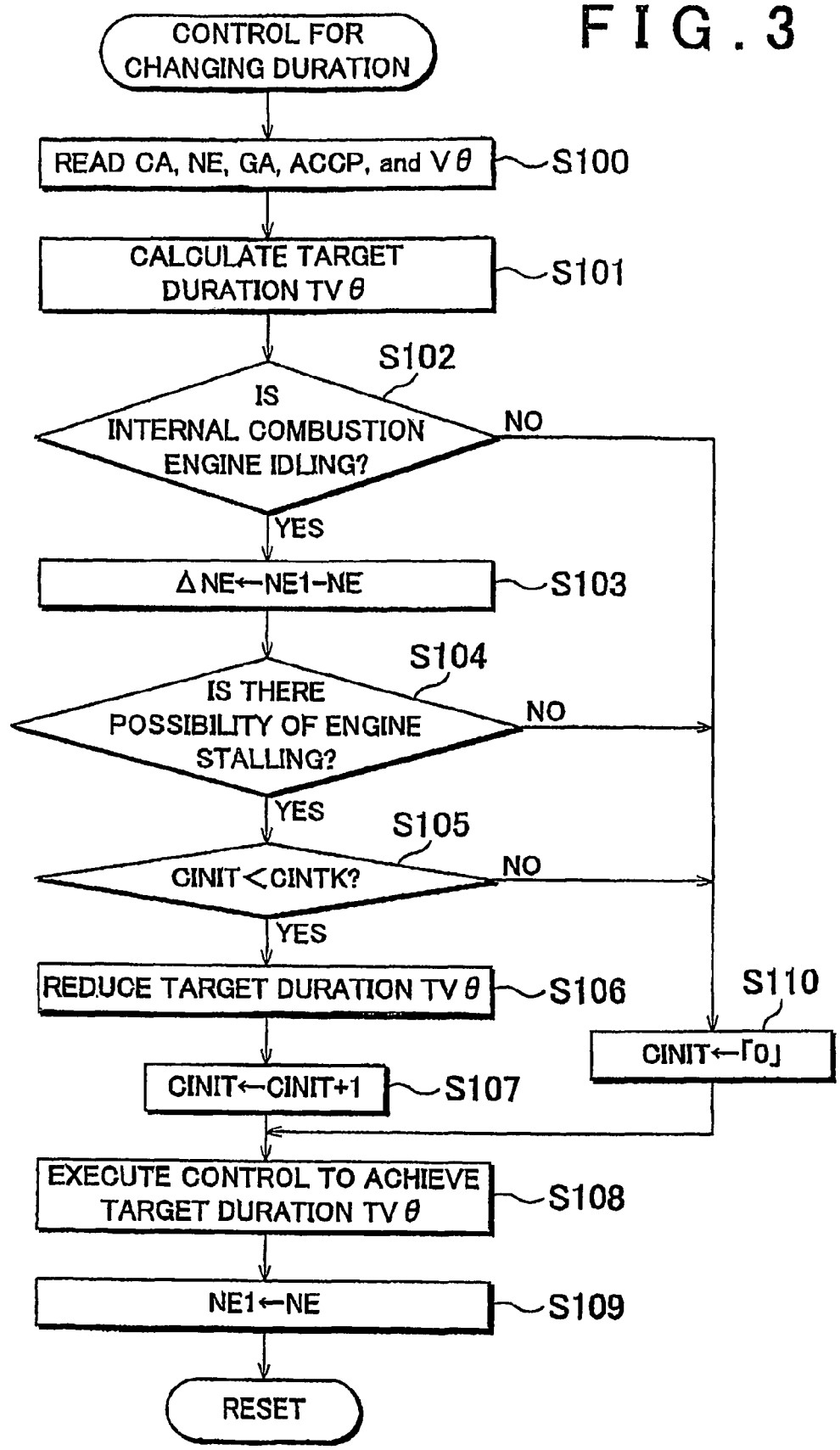
FIG. 3 is the flowchart showing the routine executed in the control for changing the duration of the intake valve in the control apparatus in FIG. 1.

As shown in FIG. 3, first, the crank angle CA, the engine speed NE, the intake air amount GA, the accelerator pedal depression amount ACCP, the duration $V\theta$ of the intake valve 20 are read based on the signals transmitted from the sensors 40 to 43 (S100). Then, the target duration $TV\theta$ for the intake valve 20 is calculated based on the engine speed NE, the intake air amount GA, the accelerator pedal depression amount ACCP, and the duration $V\theta$ of the intake valve 20 (S101).

Next, it is determined whether the internal combustion engine is idling (S102). More specifically, it is determined whether the internal combustion engine is idling based on the engine speed NE, the accelerator pedal depression amount ACC, etc.

If it is determined that the internal combustion engine is idling ("YES" in S102), the amount $\Delta NE$ of change in the engine speed (hereinafter, referred to as the "engine speed change amount $\Delta NE$") is calculated (S103). More specifically, the engine speed change amount $\Delta NE$ is calculated based on the deviation of the engine speed NE and the engine speed NE1 which is used in the immediately preceding routine (hereinafter, referred to as the "immediately-preceding engine speed NE1").

After step S103 is completed, it is determined whether there is a possibility of engine stalling (S104). More specifically, it is determined that there is a possibility of engine stalling, when the engine speed NE is equal to or lower than a predetermined value, the engine speed change amount $\Delta NE$ is equal to or greater than a predetermined value, and an air-conditioner switch is turned on. The determination result is maintained until the count value CINIT is set to "0" in step S110.

If it is determined that there is a possibility of engine stalling ("YES" in S104), it is determined whether the count value CINIT is less than the predetermined count value CINITK (S105). The electronic control unit 50 stores the function map that defines the relationship between the predetermined count value CINITK and the engine speed NE. The electronic control unit 50 calculates the predetermined count value CINITK using this function map. More specifically, the predetermined count value CINITK is the expected number of times the routine will be executed during the period T. The period T is the period until two four-stroke cycles of the internal combustion engine have elapsed after the determination that there is a possibility of engine stalling is made, when the internal combustion engine is running at the engine speed NE. During one four-stroke cycle, each of the intake stroke, the compression stroke, the power stroke and the exhaust stroke is performed once.

If it is determined that the count value CINIT is equal to or less than the predetermined value CINITK ("YES" in S105), the target duration TVθ is reduced (S106). The electronic control unit 50 stores the function map that defines the relationship among the reduction-correction amount DTVθ, the engine speed NE, and the engine speed change amount ΔNE. The electronic control unit 50 calculates the reduction-correction amount DTVθ using this function map. Then, the reduction-correction amount DTVθ is subtracted from the target duration TVθ, and the target duration DTVθ is newly set to the value obtained through the subtraction.

After step S106 is completed, the count value CINIT is incremented (S107). On the other hand, if it is determined that the internal combustion engine is not idling ("NO" in S102), or if it is determined that there is no possibility of engine stalling ("NO" in S104), the count value is set to "0" (S110). If it is determined that the count value CINIT exceeds the predetermined count value CINITK ("NO" in S105), the count value CINIT is set to "0" (S110).

After step S107 or S110 is completed, the variable valve mechanism 30 is controlled to achieve the target duration TVθ (S108). More specifically, the variable valve mechanism 30 is controlled so that the duration Vθ of the intake valve 20 is equal to the target duration TVθ.

After step S108 is completed, the current engine speed NE is stored as the immediately-preceding engine speed NE1 that will be used in the routine performed immediately subsequent to the current routine (S109), after which the routine ends. According to the first embodiment of the invention described above, the following effects are obtained.

(1) If it is determined that there is a possibility of engine stalling when the internal combustion engine is idling, the variable valve mechanism 30 is controlled so that the duration Vθ of the intake valve 20 is made shorter than the target duration TVθ which is achieved when the determination is made, only during the period until two four-stroke cycles of the internal combustion engine have elapsed after the determination is made. Accordingly, the valve overlap time is reduced only during the period until two four-stroke cycles of the internal combustion engine have elapsed after the determination that there is a possibility of engine stalling is made. As a result, the situation where the exhaust gas in the exhaust passage 16 is drawn back into the cylinder 10 due to a negative pressure produced in the intake passage 15 is less prone to occur. Accordingly, it is possible to reduce the amount of exhaust gas that remains in the combustion chamber 12 to stabilize the combustion state.

If the duration of the intake valve 20 is made shorter than the target duration which is achieved when the determination that there is a possibility of engine stalling is made, the intake air amount is temporarily reduced. However, in such a short period until several four-strokes of the internal combustion engine have elapsed after the determination is made, the influence of the reduction in the amount of exhaust gas that remains in the combustion chamber 12 is greater the influence of the reduction in the intake air amount. Accordingly, the improvement in the combustion state due to the reduction in the amount of exhaust gas that remains in the combustion chamber 18 far outweighs the deterioration of the combustion state due to the reduction in the intake air amount. In addition, setting the period during which the duration of the intake valve 20 is made shorter than the duration which is achieved when the determination is made, to the period corresponding to two four-stroke cycles makes it possible to further improve the combustion state.

After two four-stroke cycles of the internal combustion engine have elapsed after it is determined that there is a possibility of engine stalling, the variable valve mechanism 30 is controlled so that the duration of the intake valve 20 is the duration appropriate for the engine operating state. Accordingly, even if the duration Vθ of the intake valve 20 is reduced, the deterioration of the combustion state due to reduction in the intake air amount is suppressed.

Next, a control apparatus for an internal combustion engine according to a second embodiment of the invention will be described with reference to FIGS. 4 to 6. Because the basic structure of the control apparatus according to the second embodiment of the invention is similar to that of the control apparatus according to the first embodiment of the invention, the same or corresponding portions will be denoted by the same reference numerals and the description thereof will not be provided below. Only the features specific to the second embodiment of the invention will be described below.

Figure 4:
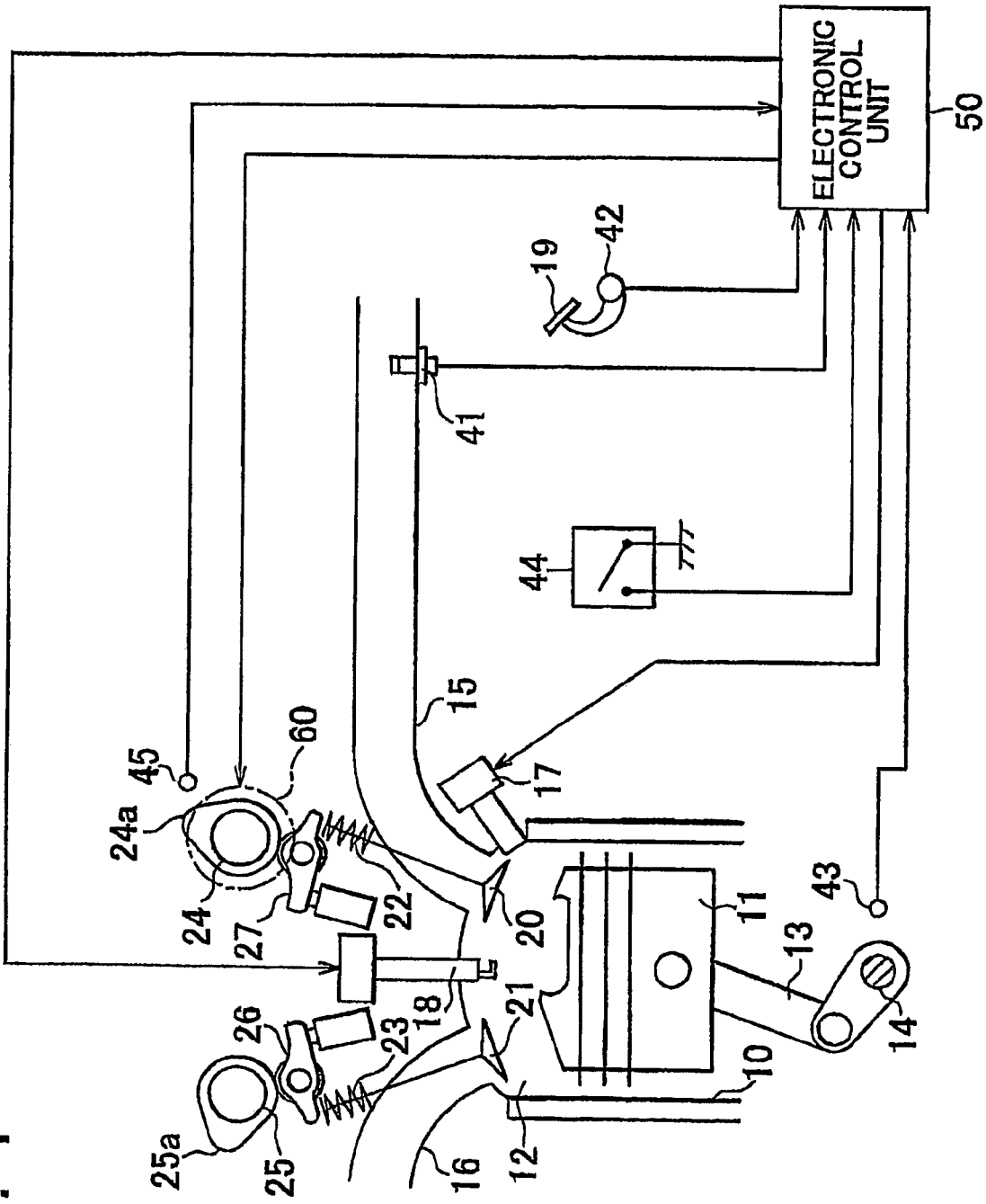
FIG. 4 is the view schematically showing the structure of a control apparatus according to a second embodiment of the invention.

As shown in FIG. 4, according to the second embodiment of the invention, an intake valve timing variable mechanism 60 that changes the valve timing of the intake valve 20 is provided instead of the variable valve mechanism 30 according to the first embodiment of the invention. The internal combustion engine is provided with a cam angle sensor 45 that detects the rotational phase Pθ of the intake camshaft 24. A signal indicating the value detected by the cam angle sensor 45 is transmitted to the electronic control unit 50 for an internal combustion engine. The electronic control unit 50 controls the electric currents passed through the fuel injection valve 17 and the spark plug 18 based on the signals transmitted from the sensors 41 to 45. The electronic control unit 50 also controls various components such as the intake valve timing variable mechanism 60. The intake valve timing variable mechanism 60 changes the relative rotational phase between the crankshaft 14 and the intake camshaft 24 under the hydraulic control.

The operation of the intake valve timing variable mechanism 60 when the valve timing of the intake valve 20 is changed will be described. The intake valve timing variable mechanism 60 changes the phase of the intake camshaft 24 with respect to the crankshaft 14 by controlling the hydraulic pressure at a timing sprocket. For example, a vane-type phase adjustment mechanism controls the hydraulic pressure.

Figure 5:
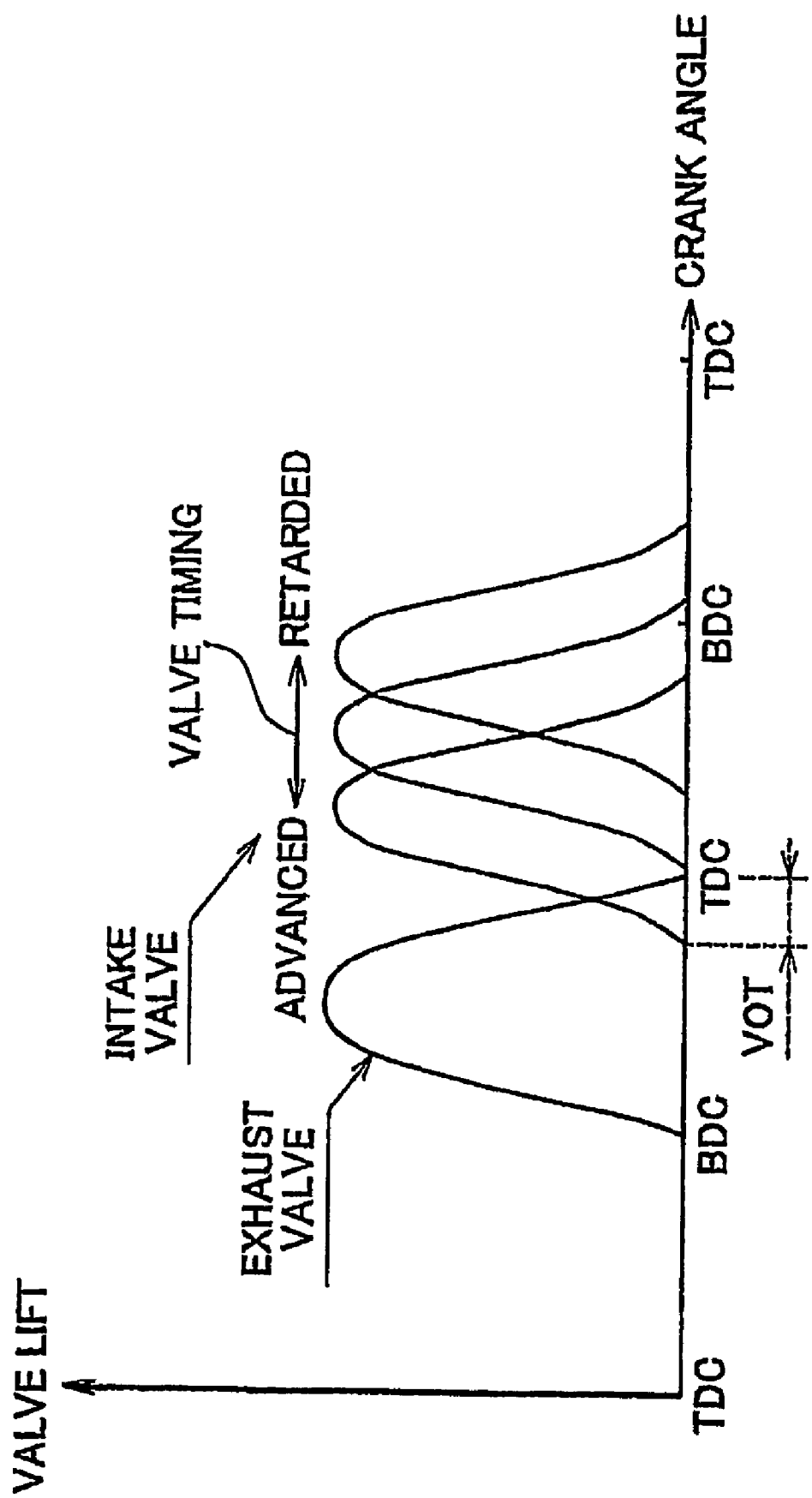
FIG. 5 is the graph showing the manner in which the valve timing of the intake valve is changed by an intake valve timing variable mechanism in the control apparatus in FIG. 4.

As shown in FIG. 5, the valve timing of the intake valve 20 is continuously advanced or retarded by the intake valve timing variable mechanism 60. Namely, the period during which both the intake valve 20 and the exhaust valve 21 are open, namely, the valve overlap time VOT shown in FIG. 5 can be changed by the intake valve timing variable mechanism 60.

Hereafter, the control for changing the valve timing of the intake valve 20 executed in the above-described internal combustion engine will be described with reference to FIG. 6. The routine shown in the flowchart in FIG. 6 is executed by the electronic control unit 50 at predetermined intervals.

Figure 6:
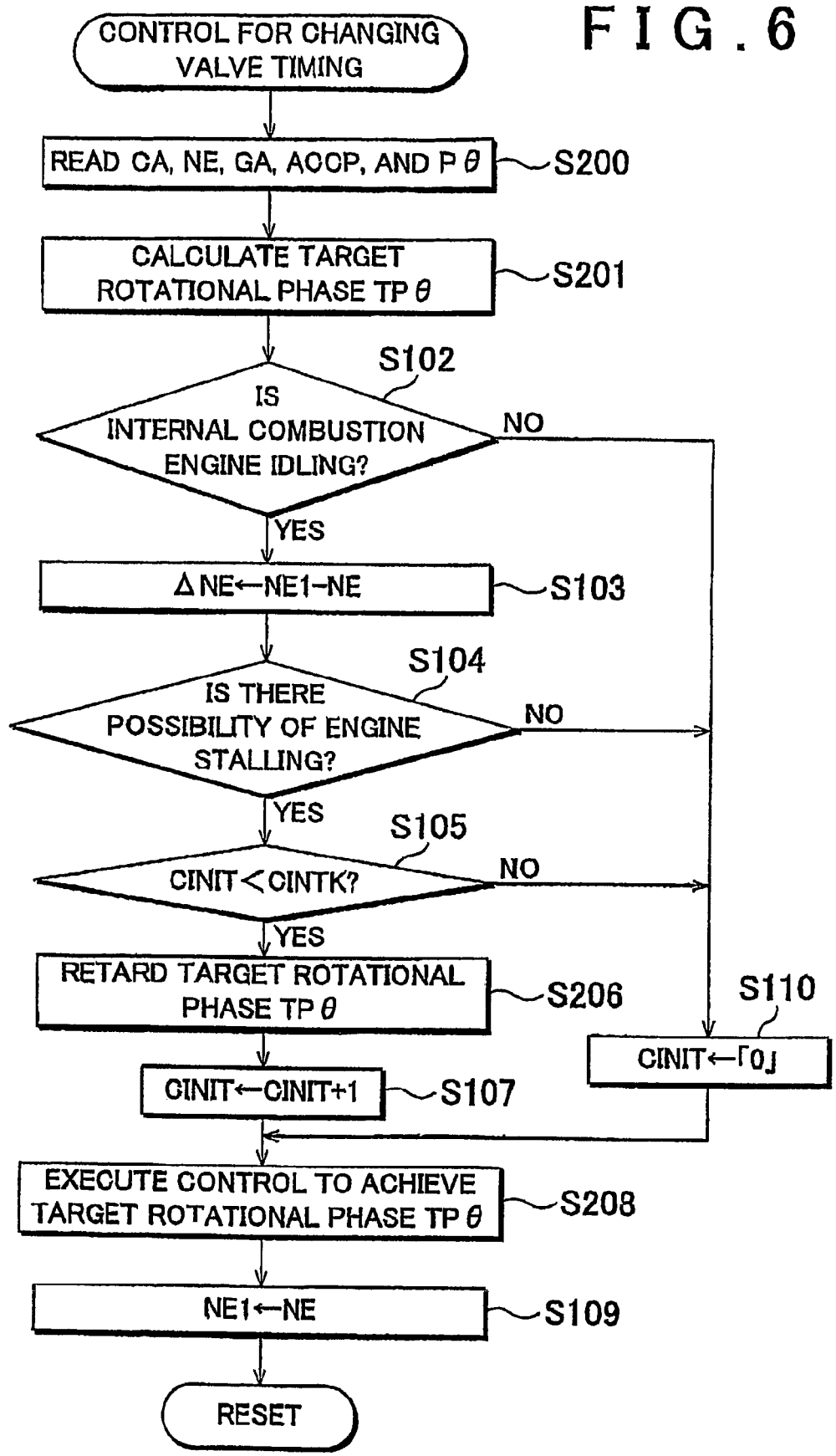
FIG. 6 is the flowchart showing the routine executed in the control for changing the valve timing of the intake valve in the control apparatus in FIG. 4.

As shown in FIG. 6, first, the rotational phase Pθ of the intake camshaft 24 is read instead of the duration Vθ of the intake valve 20 (S200). Then, the target rotational phase TPθ for the intake camshaft 24 is calculated based on the engine speed NE, the intake air amount GA, the accelerator pedal depression amount ACCP, and the rotational phase Pθ of the intake camshaft 24 (S201).

In the routine shown in the flowchart in FIG. 6, the target rotational phase TPθ is retarded instead of reducing the target duration TVθ (S206). The electronic control unit 50 stores the function map that defines the relationship among the retardation amount DTPθ, the engine speed NE, and the engine speed change amount ΔNE. The electronic control unit 50 calculates the retardation amount DTPθ using the function map. The retardation amount DTPθ is subtracted from the target rotational phase TPθ. Then, the target rotational phase TPθ is newly set to the value derived through the subtraction.

In addition, in the routine shown in the flowchart in FIG. 6, the intake valve timing variable mechanism 60 is controlled to achieve the target rotational phase TPθ instead of controlling the variable valve mechanism 30 to achieve the target duration TVθ (S208).

According to the second embodiment of the invention described above, the following effects are obtained. (1) If it is determined that there is a possibility of engine stalling when the internal combustion engine is idling, the intake valve timing variable mechanism 60, which changes the valve timing of the intake valve 20, is controlled so that the valve timing is retarded with respect to the valve timing which is achieved when the determination is made, only during the period until two four-stroke cycles have elapsed after the determination is made. Accordingly, the valve overlap time is reduced only during the period until two four-stroke cycles have elapsed after the determination that there is a possibility of engine stalling is made. As a result, the situation where the exhaust gas in the exhaust passage 16 is drawn back into the cylinder 10 due to a negative pressure produced in the intake passage 15 is less prone to occur. Accordingly, it is possible to reduce the amount of exhaust gas that remains in the combustion chamber 12 to stabilize the combustion state. After several four-stroke cycles have elapsed after it is determined that there is a possibility of engine stalling, the intake valve timing variable mechanism 60 is controlled so that the valve timing is set to the valve timing appropriate for the engine operating state. Accordingly, even if the intake air amount is temporarily reduced, the deterioration of the combustion state due to reduction in the intake air amount is suppressed.

The first and the second embodiments of the invention may be modified as follows.

According to the first embodiment of the invention, the control for driving the variable valve mechanism 30 so that the duration of the intake valve 20 is made shorter than the target duration TVθ is executed only during the period until two four-stroke cycles have elapsed after the determination that there is a possibility of engine stalling is made. However, such control may be executed only during the period until one to, for example, five cycles have elapsed after the determination is made. Similarly, according to the second embodiment of the invention, the control for driving the intake valve timing variable mechanism 60 so that the valve timing of the intake valve 20 is retarded is executed only during the period until one to, for example, five four-stroke cycles have elapsed after the determination is made. The effects substantially similar to the effects of the embodiments described above are obtained by executing the control until several four-stroke cycles have elapsed after the determination is made.

According to the first embodiment of the invention, the variable valve mechanism 30 changes the duration Vθ and the lift VL of the intake valve 20. Alternatively, the variable valve mechanism 30 may change only the duration Vθ while the lift VL is maintained constant.

According to the first and the second embodiments of the invention, whether there is a possibility of engine stalling is determined based on the engine speed NE, the engine speed change amount ΔNE, and whether the air-conditioner switch 44 is turned on. Alternatively, whether there is a possibility of engine stalling may be determined based only on the engine speed NE and whether the air-conditioner switch 44 is turned on. It may be determined that there is a possibility of engine stalling, if at least two of the following conditions are satisfied; i) the condition where the speed of the internal combustion engine is equal to or lower than a predetermined value, ii) the condition where the amount of change in the speed of the internal combustion engine is equal to or greater than a predetermined value, and iii) the condition where the auxiliary driven by the internal combustion engine is started.

According to the first and the second embodiments of the invention, whether there is a possibility of engine stalling is determined based on whether the air-conditioner switch 44 is turned on. Alternatively, whether there is a possibility of engine stalling may be determined based on whether a switch for another auxiliary, for example, the headlamp or the power steering device is turned on.

According to the first and the second embodiments of the invention, the controls for changing the duration and the valve timing are executed, respectively, when the internal combustion engine is idling. Alternatively, the control for changing the duration may be executed when the internal combustion engine is running at a low speed.

According to the first embodiment of the invention, the reduction-correction amount DTVθ of the duration Vθ is calculated based on the engine speed NE and the engine speed change amount ΔNE. Alternatively, the reduction-correction amount DTVθ of the duration Vθ may be calculated based on, for example, the intake air amount GA, the accelerator pedal depression amount ACCP, etc.

According to the first embodiment of the invention, the duration Vθ of the intake valve 20 is changed. Alternatively, a variable valve mechanism for the exhaust valve 21 may be provided, and the duration of the exhaust valve 21 may be changed by this mechanism. More specifically, if it is determined that there is a possibility of engine stalling when the internal combustion engine is idling, the variable valve mechanism for the exhaust valve 21 may be controlled so that the duration of the exhaust valve 21 is made shorter than the duration which is achieved when the determination is made, only during the period until several four-stroke cycles of the internal combustion engine have elapsed after the determination is made. Reducing the duration of the exhaust valve makes it possible to reduce the amount of exhaust gas that remains in the combustion chamber without reducing the intake air amount. When the duration of the exhaust valve 21 is reduced, the amount of exhaust gas that remains in the combustion chamber is reduced without reducing the intake air amount.

If it is determined that there is a possibility of engine stalling, both the duration of the intake valve and the duration of the exhaust valve may be reduced. In this manner, the valve overlap time is further reduced, because both the duration of the intake valve and the duration of the exhaust valve are made shorter than those achieved when it determined that there is a possibility of engine stalling. As a result, if it is determined that there is a possibility of engine stalling, the amount of exhaust gas that remains in the combustion chamber is further reduced. Also, after several four-stroke cycles have elapsed after it is determined that there is a possibility of engine stalling, the variable valve mechanism is controlled so that the duration is set to the duration appropriate for the engine operating state. Accordingly, it is possible to suppress the deterioration of the combustion state due to reduction in the intake air amount.

According to the second embodiment of the invention, the valve timing of the intake valve 20 is changed. Alternatively, an exhaust valve timing variable mechanism for the exhaust valve 21 may be provided, and the valve timing of the exhaust valve 21 may be changed by this mechanism. More specifically, if it is determined that there is a possibility of engine stalling when the internal combustion engine is idling, the exhaust valve timing variable mechanism for the exhaust valve 21 is controlled so that the valve timing is advanced with respect to the valve timing which is achieved when the determination is made, only during the period until several four-stroke cycles have elapsed after the determination is made. Advancing the valve timing of the exhaust valve 21 in this manner makes it possible to reduce the valve overlap time only during the period described above. As a result, the situation where the exhaust gas in the exhaust passage 16 is drawn back into the cylinder 10 due to a negative pressure produced in the intake passage 15 is less prone to occur. Accordingly, it is possible to reduce the amount of exhaust gas that remains in the combustion chamber 12 to stabilize the combustion state. In addition, because the combustion state is improved by changing the valve timing of the exhaust valve 21, it is possible to reduce the amount of exhaust gas that remains in the combustion chamber without reducing the intake air amount.

If it is determined that there is a possibility of engine stalling, the valve timing of the intake valve 20 may be retarded, and the valve timing of the exhaust valve 21 may be advanced. Changing the valve timings in this manner makes it possible to further reduce the valve overlap time. As a result, it is possible to further reduce the amount of exhaust gas that remains in the combustion chamber 12, if it is determined that there is a possibility of engine stalling.

The invention claimed is:

1. A control apparatus for an internal combustion engine, comprising:
   a variable valve mechanism that changes a duration of at least one of an intake valve and an exhaust valve, and
   a controller that controls the variable valve mechanism to change the duration based on an operating state of the internal combustion engine, wherein:
   if a determination that there is a possibility of engine stalling is made when the internal combustion engine is running at a low speed, the controller controls the variable valve mechanism so that the duration of at least one of the intake valve and the exhaust valve is a duration that is shorter than the duration which is achieved when the determination is made, only during a period until several four-stroke cycles of the internal combustion engine have elapsed after the determination is made.

2. The control apparatus according to claim 1, wherein the controller controls the variable valve mechanism to change the duration of the intake valve and the duration of the exhaust valve, and
   if the determination that there is a possibility of engine stalling is made when the internal combustion engine is running at a low speed, the controller controls the variable valve mechanism so that the duration of each of the intake valve and the exhaust valve is the duration that is shorter than the duration which is achieved when the determination is made, only during the period until several four-stroke cycles of the internal combustion engine have elapsed after the determination is made.

3. The control apparatus according to claim 2, wherein the controller determines that there is a possibility of engine stalling, when at least two of i) a condition where a speed of the internal combustion engine is equal to or lower than a predetermined value, ii) a condition where an amount of change in the speed of the internal combustion engine is equal to or greater than a predetermined value, and iii) a condition where an auxiliary that is driven by the internal combustion engine is started are satisfied.

4. The control apparatus according to claim 1, wherein the controller determines that there is a possibility of engine stalling, when at least two of i) a condition where a speed of the internal combustion engine is equal to or lower than a predetermined value, ii) a condition where an amount of change in the speed of the internal combustion engine is equal to or greater than a predetermined value, and iii) a condition where an auxiliary that is driven by the internal combustion engine is started are satisfied.

5. A control apparatus for an internal combustion engine, comprising:
   a valve timing variable mechanism that changes valve timing of at least one of an intake valve and an exhaust valve, and
   a controller that controls the variable valve mechanism to change the valve timing based on an operating state of the internal combustion engine, wherein:
   if a determination that there is a possibility of engine stalling is made when the internal combustion engine is running at a low speed, the controller controls the valve timing variable mechanism so that the valve timing of at least one of the intake valve and the exhaust valve is valve timing that differs from the valve timing which is achieved when the determination is made, only during a period until several four-stroke cycles of the internal combustion engine have elapsed after the determination is made.

6. The control apparatus according to claim 5, wherein, if the determination that there is a possibility of engine stalling is made when the internal combustion engine is running at a low speed, the controller controls the valve timing variable mechanism so that the valve timing of the intake valve is valve timing that is retarded with respect to the valve timing which is achieved when the determination is made, only during the period until several four-stroke cycles of the internal combustion engine have elapsed after the determination is made.

7. The control apparatus according to claim 6, wherein the controller determines that there is a possibility of engine stalling, when at least two of i) a condition where a speed of the internal combustion engine is equal to or lower than a predetermined value, ii) a condition where an amount of change in the speed of the internal combustion engine is equal to or greater than a predetermined value, and iii) a condition where an auxiliary that is driven by the internal combustion engine is started are satisfied.

8. The control apparatus according to claim 5, wherein if the determination that there is a possibility of engine stalling is made when the internal combustion engine is running at a low speed, the controller controls the valve timing variable mechanism so that the valve timing of the exhaust valve is valve timing that is advanced with respect to the valve timing which is achieved when the determination is made, only during the period until several four-stroke cycles of the internal combustion engine have elapsed after the determination is made.

9. The control apparatus according to claim 8, wherein the controller determines that there is a possibility of engine stalling, when at least two of i) a condition where a speed of the internal combustion engine is equal to or lower than a predetermined value, ii) a condition where an amount of change in the speed of the internal combustion engine is equal to or greater than a predetermined value, and iii) a condition where an auxiliary that is driven by the internal combustion engine is started are satisfied.

10. The control apparatus according to claim 5, wherein, if the determination that there is a possibility of engine stalling is made when the internal combustion engine is running at a low speed, the controller controls the valve timing variable mechanism so that the valve timing of the intake valve is valve timing that is retarded with respect to the valve timing which is achieved when the determination is made, and the valve timing of the exhaust valve is valve timing which is advanced with respect to the valve timing which is achieved when the determination is made, only during the period until several four-stroke cycles of the internal combustion engine have elapsed after the determination is made.

11. The control apparatus according to claim 10, wherein the controller determines that there is a possibility of engine stalling, when at least two of i) a condition where a speed of the internal combustion engine is equal to or lower than a predetermined value, ii) a condition where an amount of change in the speed of the internal combustion engine is equal to or greater than a predetermined value, and iii) a condition where an auxiliary that is driven by the internal combustion engine is started are satisfied.

12. The control apparatus according to claim 5, wherein the controller determines that there is a possibility of engine stalling, when at least two of i) a condition where a speed of the internal combustion engine is equal to or lower than a predetermined value, ii) a condition where an amount of change in the speed of the internal combustion engine is equal to or greater than a predetermined value, and iii) a condition where an auxiliary that is driven by the internal combustion engine is started are satisfied.

\* \* \* \* \*